US007317905B2

(12) United States Patent
Haefner et al.

(10) Patent No.: US 7,317,905 B2
(45) Date of Patent: Jan. 8, 2008

(54) RADIO-CONTROLLED CLOCK AND METHOD FOR GAINING TIME INFORMATION

(75) Inventors: Horst Haefner, Heilbronn (DE); Roland Polonio, Neckarsulm (DE); Hans-Joachim Sailer, Heilbronn (DE)

(73) Assignees: ATMEL Germany GmbH, Heilbronn (DE); C-Max Europe GmbH, Heilbronn (DE)

( * ) Notice: Subject to any disclaimer, the term of this patent is extended or adjusted under 35 U.S.C. 154(b) by 411 days.

(21) Appl. No.: 11/045,441

(22) Filed: Jan. 28, 2005

(65) Prior Publication Data

US 2005/0202796 A1 Sep. 15, 2005

(30) Foreign Application Priority Data

Jan. 29, 2004 (DE) ...................... 10 2004 004 411

(51) Int. Cl.
*H04B 1/06* (2006.01)

(52) U.S. Cl. ......................... 455/265; 375/354; 368/47

(58) Field of Classification Search ............. 455/180.1, 455/180.3, 181.1, 260–265; 375/354–357; 368/47, 48

See application file for complete search history.

(56) References Cited

U.S. PATENT DOCUMENTS 4,440,501 A 4/1984 Schulz
4,768,178 A 8/1988 Conklin et al.
4,823,328 A 4/1989 Conklin et al.
5,105,396 A 4/1992 Ganter et al.
5,349,570 A 9/1994 Kaiser
5,528,560 A 6/1996 Ogiyama
5,727,022 A 3/1998 Schaefer et al.
5,805,647 A 9/1998 Schafer et al.
5,818,851 A 10/1998 Memmler (Continued)

FOREIGN PATENT DOCUMENTS

DE 1 803 093 8/1969

(Continued)

OTHER PUBLICATIONS

Wolfgang Hilberg, "Funkuhren" (Radio-Controlled Clocks); R. Oldenbourg Publishers, Munich, Federal Republic of Germany; Jan. 1983; ISBN 3-486-27341-8; pp. 219-234; p. 230 last paragraph.

(Continued)

*Primary Examiner*—Thanh Cong Le
(74) *Attorney, Agent, or Firm*—W. F. Fasse; W. G. Fasse

(57) ABSTRACT

Time signals for controlling a radio clock are transmitted by a transmitter and received by a receiver as amplitude modulated time signals, formed of a multitude of time frames. Each time frame has a constant duration. These time signals are first automatically amplified. A so-called telegram of at least one received time signal is stored in a memory. At least one change of an amplitude of a time signal is determined in advance or predetermined and such amplitude change has a duration that is longer than a given or determined duration (Δt). When a predetermined amplitude change begins the automatic amplification is locked-in. The present circuit arrangement for operating a radio-controlled clock is equipped with components for performing the foregoing operations.

23 Claims, 3 Drawing Sheets

U.S. PATENT DOCUMENTS

| | | | |
|---|---|---|---|
| 6,456,831 B1 * | 9/2002 | Tada | 455/180.3 |
| 2003/0117901 A1 | 6/2003 | Takada et al. | |
| 2003/0189876 A1 | 10/2003 | Chan | |
| 2005/0036514 A1 | 2/2005 | Polonio et al. | |
| 2005/0116856 A1 | 6/2005 | Haefner et al. | |
| 2005/0122951 A1 | 6/2005 | Kuehnle et al. | |
| 2005/0122952 A1 | 6/2005 | Haefner et al. | |
| 2005/0147080 A1 | 7/2005 | Haefner et al. | |
| 2005/0169230 A1 | 8/2005 | Haefner | |
| 2005/0175039 A1 | 8/2005 | Haefner et al. | |
| 2005/0260958 A1 | 11/2005 | Haefner et al. | |

FOREIGN PATENT DOCUMENTS

| | | |
|---|---|---|
| DE | 27 01 609 | 2/1978 |
| DE | 26 43 250 | 3/1978 |
| DE | 28 02 040 | 7/1979 |
| DE | 30 15 312 | 10/1981 |
| DE | 31 01 406 | 1/1983 |
| DE | 32 36 162 | 4/1984 |
| DE | 33 46 091 | 7/1985 |
| DE | 35 04 338 | 8/1986 |
| DE | 35 16 810 | 11/1986 |
| DE | 37 19 650 | 12/1988 |
| DE | 37 33 965 | 4/1989 |
| DE | 37 33 966 | 4/1989 |
| DE | 42 37 112 | 5/1993 |
| DE | 43 04 321 | 8/1993 |
| DE | 43 19 946 | 12/1993 |
| DE | 42 27 502 | 3/1994 |
| DE | 42 33 126 | 4/1994 |
| DE | 93 00 945 | 5/1994 |
| DE | 42 42 384 | 6/1994 |
| DE | 43 32 798 | 3/1995 |
| DE | 44 03 124 | 8/1995 |
| DE | 44 12 892 | 10/1995 |
| DE | 44 42 818 | 6/1996 |
| DE | 195 14 031 | 10/1996 |
| DE | 195 14 036 | 10/1996 |
| DE | 195 40 592 | 5/1997 |
| DE | 198 08 431 | 9/1999 |
| DE | 298 13 498 | 12/1999 |
| EP | 0 042 913 | 1/1982 |
| EP | 0 201 061 | 11/1986 |
| EP | 1 079 554 | 2/2001 |
| EP | 1 316 861 | 6/2003 |
| JP | 11-030677 | 2/1999 |
| JP | 2002-286877 | 10/2002 |
| JP | 2003-125012 | 4/2003 |
| WO | WO 2004/036742 | 4/2004 |

OTHER PUBLICATIONS

Michael Arnoldt, “Zeitzeichen- und Normalfrequenzempfang (Time Signal and Normal Frequency Reception)”; Franzis’, Munich, Federal Republic of Germany; Jun. 1987; ISBN 3-7723-8171-5; pp. 29-41, 97, 124-161; p. 39 last paragraph Section 1.4.5; p. 40 section 1.4.6.

“Die erste Funkuhr am Handgelenk (The First Radio-Controlled Watch on the Wrist)”; article in magazine Funkschau 15/1990, pp. 52, 53.

Peter Hetzel, “Time Information and Normal Frequency” (Zeitinformation und Normalfrequenz), Telekom Praxis, vol. 1, 1993, pp. 25 to 36.

Reinhard Kalhoefer, Die Realisierung kompakter stoersicherer Funkuhren mit den Mitteln der Mikroelktronik, Darmstaedter, Dissertation D 17, 1980, pp. 6-18, 50-50, 100-102, 124-129; p. 17, second paragraph, p. 58, last paragraph.

* cited by examiner

RADIO-CONTROLLED CLOCK AND METHOD FOR GAINING TIME INFORMATION

CROSS-REFERENCE TO RELATED APPLICATION

This application is related to U.S. application Ser. No. 11/057,030 filed on Jan. 28, 2005. The entire disclosure of the related application is incorporated herein by reference.

PRIORITY CLAIM

This application is based on and claims the priority under 35 U.S.C. §119 of German Patent Application 10 2004 004 411.2, filed on Jan. 29, 2004, the entire disclosure of which is incorporated herein by reference.

FIELD OF THE INVENTION

Time information is retrieved from received amplitude modulated time signals transmitted by a time signal transmitter. The received information is used to operate a radio-controlled clock or a receiver circuit for such a clock.

BACKGROUND INFORMATION

The radio-controlled transmission of time information is performed by transmitting so-called time signals by respective transmitters referred to herein as time signal transmitters. The term "time signal" is intended to mean a transmitter signal of short duration which is transmitted for providing time information in the form of a time reference provided by the transmitter. The time reference is a modulated oscillation generally comprising several time markers which, upon demodulation merely are an impulse which reproduces the transmitted time reference with a certain uncertainty or inaccuracy.

The German long wave time signal transmitter station DCF-77 transmits, in a continuous operation controlled by atomic clocks, amplitude modulated long wave time signals in accordance with the official atomic time scale MEZ (middle European time) with a transmitter power of 50 kW at a frequency of 77.5 kHz. Similar time signal transmitters exist in other countries for the transmission of time information on a long wave carrier frequency in the range between 40 to 120 kHz. All countries using such transmitters transmit the time information as a telegram having a duration of exactly 1 minute.

FIG. 1 shows an encoding scheme A referred to as a telegram. This telegram A represents the encoded time information transmitted by the German time signal transmitter DCF-77. The encoding scheme or telegram A comprises 59 bits, whereby one bit corresponds to one second of the time frame. Thus, within the duration of 1 minute a so-called time signal telegram can be transmitted. This telegram comprises binary encoded information, particularly information regarding time and date. The first fifteen bits B comprise a general encoding which, for example, may contain operational information. The next 5 bits C contain general information. Thus, the letter R designates the antenna bit. A1 designates an announcement bit for the transition from the central European time (MEZ) to a central European summer time (MESZ) and back again. Bits Z1 and Z2 designate time zone bits. Bit A2 designates an announcement bit for a leap second and bit S designates a start bit for the beginning of the encoded time information. Starting with bit 21 and up to bit 59 these bits transmit the time and data information with a BCD code, whereby the data are respectively relevant for the next following minute. The bits in the area D contain information regarding the minute. The bits in the area E contain information regarding the hour. The bits in the area F contain information regarding the calendar day. The bits in the area G contain information regarding the day of the week. The bits in the area H contain information regarding the month. The bits in the area I contain information regarding the calendar year. These informations are provided in a bit-by-bit fashion in an encoded form. So-called testing bits P1, P2, P3 are provided respectively at the ends of the areas D, E and I. The sixtieth bit of the telegram is not designated and serves for indicating the beginning of the next time frame. The letter M designates the minute marker and thus the beginning of a time signal telegram.

The structure and the bit allocation of the encoding scheme or telegram A of FIG. 1 for transmitting of time signals is generally known and described, for example in an article by Peter Hetzel, "Time Information and Normal Frequency" in the Publication "Telecom Practice", Vol. 1, 1993.

The time signal information is transmitted with the aid of individual second markers amplitude modulated onto a carrier. The modulation comprises a reduction X1, X2 or an increase of the carrier signal X at the beginning of each second. In the case of the German time signal transmitter DCF-77 the transmitted time signals are modulated onto the carrier amplitude at the beginning of each second, with the exception of the fifty-ninth second, within each minute. For example, reducing the carrier amplitude for 0.1 second represents X1, reducing the carrier amplitude for 0.2 seconds represents X2. The amplitude reduction amounts to about 25% down from the amplitude peak. These amplitude reductions X1, X2 of different time durations define respective second markers or, after decoding, data bits in decoded form. These different time durations of the second markers serve for the binary encoding of the clock time and date. Second markers X1 of a duration of 0.1 seconds correspond to the binary "O" and time markers X2 with a duration of 0.2 seconds correspond to the binary "1". The absence of the sixtieth second marker announces the next following minute marker. An evaluation of the time information transmitted by the time signal transmitter may then be performed in combination with the respective second.

FIG. 2 illustrates a portion of an example of an amplitude modulated time signal. However, the evaluation of the precise time and the precise date is only possible if the fifty-nine second bits of a minute are recognized unambiguously so that a logic "0" or a logic "1" may be allocated to each of these respective second markers.

Modern time signal receivers comprise a so-called automatic gain control stage (AGC). Such automatic gain control stage makes it possible to automatically adapt the amplification to a respective level of the received time signal, thereby taking into account a change of the amplitude of the received time signal. Without such automatic gain control adjustment always the same amplification would be used, which would lead to an undesirable over-control or an under-control. The automatic gain control is particularly advantageous for signals that have been damped more or less during transmission over the transmission range. Further, the automatic gain control optimizes the sensitivity of an amplifier.

A problem exists with received time signals because frequently noise signals are superimposed on the time signals. Such noise signals can, for example be caused by electromagnetic radiation of electric and electronic equipment within the transmission range of the time signal transmitter to the time signal receiver. Such noise signals may also be caused by the electric components of the time signal receiver itself. In this connection the use of an automatic gain control would follow with its amplification in an undesirable manner the time signal change caused by the noise signal. The problem is particularly seen in that depending on the type and size of the noise signal, a faulty receipt of the time signals may be involved. The term “faulty receipt” means that during the duration of a received minute protocol erroneous binary decisions are being made which lead to a faulty evaluation of at least one data bit of the minute protocol. The time derived from the received time signal would, in that case, no longer be correct.

When known electric disturbances occur, for example caused by the advancing of a stepping motor that drives the pointers of the radio-controlled clock it is possible to hold the automatic gain control to an amplification value that was present prior to the occurrence of such a disturbance. Such holding of the amplification prevents making the time signal receiver less sensitive by an undesirable tracking of the automatic amplification adjustment caused by a noise signal. This holding of the amplification to a value not disturbed by noise can, however, only be globally applied to the entire received time signal and only when the noise impulse is known. A purposeful application of this method to a particular second impulse or a particular data bit within the minute protocol is, however, not possible.

Another problem results when the protocol of the transmitted time signal provides second impulses of rather long duration. Since the time signal amplitudes are modulated, the AGC closed loop control begins the tracking of the amplification value in the receiver already when second impulses occur that are critical to the AGC control. When AGC-critical second impulses occur and taking into account the dynamic of the AGC amplifier, the second impulses can be so long that a change in the amplitude caused by the second impulse already causes a tracking of the AGC amplification. This change of the AGC amplification leads directly to the situation that at a next modulation jump, that is, at the end of the respective AGC-critical second impulse, at which the amplitude of the time signal returns to its normal value, the receiver is over-controlled due to the now present larger amplification. An unnecessary larger amplification leads to distortions of the signal in the receiver at the next second impulse because the closed loop control voltage and thus the automatic AGC adjustment is no longer at the mean value of the received time signal that is necessary for the field strength of the received time signal. This situation can lead, depending on the type of time signal received, to a reduction of the receiver sensitivity. The sensitivity reduction in turn will result in a reduced receiver range of the radio-controlled clock and such reduced range will be noticeable by the user of the clock.

A further problem is seen in that the duration of the next following second impulse can be recognized as being faulty which in turn leads to faulty interpretations that, in the worst scenario, can lead to a faulty decoding.

The above mentioned problems could be solved by influencing the closed loop control voltage. Such influencing of the closed loop control voltage and thus of the adjustable amplification can basically be accomplished in software fashion. However, the required software would be extraordinarily costly, particularly with regard to the storage capacity required for the software. Such a software solution would perform an automatic amplification adjustment only for those cases of an undesirable disturbance and in case of a change of the amplitude mean value of the time signal. Such software solution would not be effective in connection with a time signal amplitude change that is caused by a second impulse. In order to realize such a function capability with the respective dynamic, a powerful micro-controller would be required. However, currently, radio-controlled clocks are typically equipped with a four-bit micro-controller. Such a micro-controller does not provide the required dynamic for an effective influencing of the feedback control voltage or at least it would only be of limited use. More specifically, a complete implementation by software for controlling the closed loop feedback voltage is only possible with such a micro-controller to a very limited extent because the requirements exceed the capabilities of a four-bit micro-controller. Costs prohibit the use of a more powerful micro-controller in connection with radio-controlled clocks.

The following references provide a general background information for radio-controlled clocks and receiver circuits for receiving time signals. These references are: DE 198 08 431 A1, DE 43 19 946 A1, DE 43 04 321 C2, DE 42 37 112 A1 and DE 42 33 126 A1. With regard to information retrieving and information processing of time information from time signals, reference is made to the following German Patent Publications DE 195 14 031 C2, DE 37 33 965 C2, and EP 042 913 B1.

OBJECTS OF THE INVENTION

In view of the above it is the aim of the invention to achieve the following objects singly or in combination:

- to provide a time signal receiver circuit with an improved sensitivity for receiving time signals with an automatic gain control adjustment;
- to reduce the fault frequency that may be caused by faulty impulse durations;
- to prevent an over-loading or over-control of the time signal receiver, especially where there is a tendency of such over-control due to a drop or reduction of the amplitude for a duration that becomes critical for the automatic gain control; and
- to provide an effective method for the evaluation certainty and the reception certainty of the time information by an intended manipulation of the automatic gain control adjustment.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved by a method according to the invention for obtaining time information from received amplitude modulated time signals which comprise a multitude of time frames each having a constant duration, by the combination of the following steps:

a) the received time signals are amplified through a controlled automatic gain control, b) the telegram of at least one received time signal is stored in a first memory to provide a stored telegram;

c) at least one change of the time signal amplitude is predetermined or determined in advance, whereby the amplitude change is longer in duration than a first preselected time duration ($\Delta t$); and d) the automatic amplification or gain control is locked-in with a time reference to said at least one predetermined amplitude change. Preferably, the amplification adjustment is locked-in at the beginning of a predetermined amplitude change.

The preselected time duration is chosen so that an amplitude change duration that would have an adverse amplification effect is prevented from having such effect by locking-in the amplification adjustment.

A circuit arrangement according to the invention for a radio-controlled clock or such a clock equipped for receiving and obtaining time information from time signals transmitted by a time signal transmitter comprises the following components: a first memory in which at least one telegram of one time signal is stored or can be stored, an amplifier for amplifying a received time signal. The amplifier comprises at least one automatic amplifier stage. The amplification of this stage is adaptable to the amplitude of a received time signal. The circuit further includes a control unit for controlling the amplifier, whereby the control unit is operatively coupled with the memory or at least one memory. The control unit controls the automatic amplifier in accordance with a predetermined amplitude change of the time signal, whereby the change has a duration longer than the above mentioned first preselected time duration. The control by the control unit of the automatic amplifier stage is such that the latter's amplification remains locked-in at the predetermined amplitude change. Thus, amplitude changes of adverse duration are prevented from adversely affecting the amplification of the received time signal.

The present invention is based on initially storing the telegram of the transmitted time signal in a memory that is provided especially for this purpose, and to synchronize the time signal evaluation with the start of the transmitted time signal telegram. The combination of these two features permits to exactly predict at which position and at which time in the minute protocol of the time signal telegram an amplitude change will become so long in its duration that it will have an adverse effect on the automatic gain control. Specifically, the invention predicts a second impulse that has a time duration which is relevant for the adjustment of the automatic amplification. The invention basically teaches to lock in the automatic amplification or the AGC amplifier in a pointwise fashion for such points of time in which AGC-critical second impulses are to be expected. As a result, a reduction of the time signal or rather the time signal amplitude, caused by AGC-critical second impulses does not adversely influence the automatic amplification adjustment, or influences the amplification adjustment merely in a negligibly small manner. Thus, the invention prevents an undesirable settling and accordingly an over-loading or over-controlling of the receiver, that could occur due to a signal reduction or amplitude reduction with an AGC-critical duration.

According to the invention it now becomes particularly possible to purposefully extract an individual second impulse out of a time signal telegram at which second impulse the automatic amplification shall be locked-in. Thus, the invention discloses an especially simple, yet very effective method for significantly increasing the signal evaluation certainty and the reception certainty by an intended manipulation or adjustment of the automatic amplification.

Further advantages of the invention are seen in that the receiver of a radio-controlled clock operated and equipped as taught herein, has a larger system sensitivity because distortions within the receiver and falsifications of the duration of the second impulses are avoided or at least significantly reduced. Additionally, the fault rate due to falsified or distorted second impulse durations has been reduced.

In a further embodiment of the invention the locked-in amplification is automatically released at the end of a predetermined amplitude reduction. The end of such an amplitude reduction can, for example be determined by measuring the duration of the AGC-critical reduction. Additionally or alternatively, the end of an AGC-critical reduction can also be determined directly on the basis of knowing the duration of the amplitude reduction. This critical duration is derived from the known time signal duration. In this sense it is also possible to determine the duration without precisely observing the time signal. Accordingly, the end of a respectively predetermined amplitude reduction can be determined, for example, by a simple impulse counter.

According to an especially advantageous embodiment of the invention, the automatic amplification is locked-in to an amplification value which was present prior to the predetermined amplitude reduction. This feature has the advantage that following the end of the predetermined amplitude reduction the amplification can resume as quickly as possible the nominal amplification level of the time signal.

In an advantageous first alternative embodiment the predetermined amplitude reductions are determined on the basis of the telegram of the time signals stored in the memory. This time signal and thus the relevant predetermined amplitude reductions are stored in a memory especially provided for this purpose.

Preferably, in this first alternative embodiment of the invention the received time signal is first synchronized with the beginning of the minute of the stored telegram. Following this synchronization it is known, based on the telegram at which position some of the AGC-critical amplitude reductions are present. In such a case the AGC amplifier merely needs to be locked-in at these points of time.

In a second advantageous embodiment the expected duration of an amplitude reduction of a received time signal is determined during the demodulation or during the evaluation. This makes it possible to determine the amplitude reductions which are longer in duration than the predetermined AGC-critical duration. This feature particularly makes it possible, when a predetermined time duration is exceeded and still during the evaluation of an amplitude reduction of the time signal, to predict the expectable total duration of this particular amplitude reduction. In this case it is practical to lock-in the automatic amplification adjustment only after a given time duration following the beginning of a predetermined amplitude reduction.

According to a third embodiment of the present method the amplitude reduction can be determined during or even prior to the demodulation or evaluation of an amplitude reduction by estimating its expectable duration. This third embodiment of the present method is based on the recognition or experience that data bits which are present in different sequentially following minute telegrams change relatively rarely. For example the data bits relating to status information and data bits relating to the respective week, month and year, change, based on experience, relatively rarely. If this information is known from preceding minute telegrams, for example in that these informations are stored in a memory especially provided for this purpose, then it becomes possible to estimate for the current actual minute telegram whether data bits are present which do not change. If these data bits are AGC-critical data bits then the respective AGC amplifier can be locked-in for any particular AGC-critical data bit. A modification of this method allocates a certain probability to each individual data bit. The allocated probability then provides information whether the individual data bit is an AGC-critical bit or not. Depending on the particular amplification or implementation it is then possible to lock in the respective AGC amplifier for this particular data bit starting with a predetermined probability.

This embodiment of the invention makes it possible or permissible to estimate in advance the expectable duration of a respective amplitude reduction. For this purpose a respective memory for storing the corresponding data informations is required. Additionally, an evaluation unit is necessary which evaluates the data bits of preceding minute telegrams. As a result, this embodiment is somewhat more expensive than the two alternate methods described above. However, an advantage of this third embodiment is that the respective duration of an amplitude reduction does not need to be determined in advance. Moreover, no synchronization to the begin of a minute is required.

The time information is available in the time signal in a bitwise manner. A value of a respective data bit is obtained on the basis of the allocated telegram of the time signal transmitter from a duration of an amplitude change of the transmitted time signal. A logic binary value is allocated to each respective data bit. The binary value is derived from the duration of the amplitude change. A first duration of the amplitude change of the time signal designates a first logical value of the data bit. A second duration designates a corresponding second logic value of the data bit. The first and second time durations are predetermined by the respective telegram of the time signal transmitter. Typically, the first logic value designates or corresponds to a logic "0" indicating a low voltage level while the second logic value designates a logic "1" corresponding to a high voltage level. These logic designations can be reversed, if desired.

A change in most telegrams of a time signal transmitted by a time signal transmitter designates an amplitude reduction of the time signal. However, a change in the form of an amplitude increase can be equally expressed by a reverse logic.

Generally, the first duration of an amplitude change is shorter than the duration of a second amplitude change. Thus, the predetermined reductions or increases are defined as changes of the second duration within the time signal.

According to the invention the automatic amplifier adjustment is locked-in only for such amplitude reductions that have a duration which becomes AGC-critical relative to the dynamic of the automatic amplification adjustment. Without an amplification lock-in, such AGC-critical duration would cause the AGC amplifier to react. Thus, an AGC-critical duration corresponds at least to the second duration. Accordingly, during the first duration the automatic amplification adjustment is not locked-in. Depending on the AGC dynamic, the first duration is typically so short that the automatic amplification adjustment does not change or at least does not substantially change in response to the respective amplitude reductions. The second duration which designates reductions that are AGC-critical, is typically of a longer duration such as equal or larger to 500 msec, particularly equal or larger to 800 msec.

In an embodiment with a second memory, the predetermined amplitude reduction or rather the amplitude duration is stored in the second memory. More specifically, those second impulses or amplitude reductions are stored in the second memory which have a duration that is relevant to the automatic amplification adjustment.

The first and/or the second memory can, for example, be implemented as software or hardware memories. It is particularly advantageous if the first and the second memory are part of a single storage.

In an advantageous embodiment the different telegrams of different time signal transmitters may be stored in the form of a table to provide a table look up in a memory that is especially provided for this purpose and is preferably integrated into the receiver circuit. An integrated memory may, for example be selected from a RAM, a ROM, a SRAM or the like type of memory. Additionally or alternatively, the telegram may be implemented as hardware logic, for example in a PLD or an FPGA circuit.

In an embodiment of the present circuit arrangement a demodulator is provided for demodulating the received time signal. This circuit arrangement also comprises a control and evaluating unit which determines in advance the expected duration of an amplitude reduction during the demodulation of the received time signal.

In a further embodiment the present circuit arrangement also includes a reference clock generator which provides a reference clock signal with a predetermined clock frequency. This circuit also includes a counter which counts the clock cycles, thereby continuously providing by its count or count signal a measure for the already expired duration of an amplitude reduction or change.

The control and evaluation unit evaluates the count signal and generates a control signal when a predetermined count is exceeded. Such predetermined count corresponds to a predetermined duration, for example an AGC-critical duration of an amplitude reduction. This predetermined duration is selected so that it takes into account the dynamics of the automatic amplifier adjustment. More specifically, the evaluating unit does not react to amplitude reductions of short duration to which the automatic amplification adjustment does not react. Thus, no lock-in of the automatic amplification adjustment takes place in response to short duration amplitude reductions. However, the amplification of the automatic amplifier stage is locked-in by the control and evaluating unit when the predetermined count is exceeded.

The automatic amplification stage is preferably a preamplifier and the amplifier section includes at least one additional amplifier stage connected in series with the automatic preamplifier stage.

The present method and circuit arrangement can be implemented on a software basis or on a hardware basis. Accordingly, the present teaching can be used in any type of receiver for radio-controlled clocks.

The functional components for the present automatic amplification adjustment can be advantageously part of a logic circuit, particularly of a hardwired logic circuit. This applies particularly to the control and evaluation unit, to the counter and/or a shift register which all may be advantageously part of a logic circuit for example an FPGA circuit or a PLD circuit. Alternatively, these circuits may be implemented with a micro-controller which is typically part of a radio-controlled clock anyway. However, it is the special advantage of the invention that the required circuits can easily be realized separately, thereby not requiring a high powered micro-controller. Particularly, taking into account the AGC-critical second impulses and correspondingly modifying the automatic amplification adjustment can easily be realized in a circuit technical sense a logic circuit arrangement which leaves the micro-processor available for other purposes such as decoding and evaluating the received time signal and the handling of disturbances in the time signal as well as other specific tasks.

BRIEF DESCRIPTION OF THE DRAWINGS

In order that the invention may be clearly understood, it will now be described in connection with example embodiments thereof, with reference to the accompanying drawings, wherein.

Figure 1:
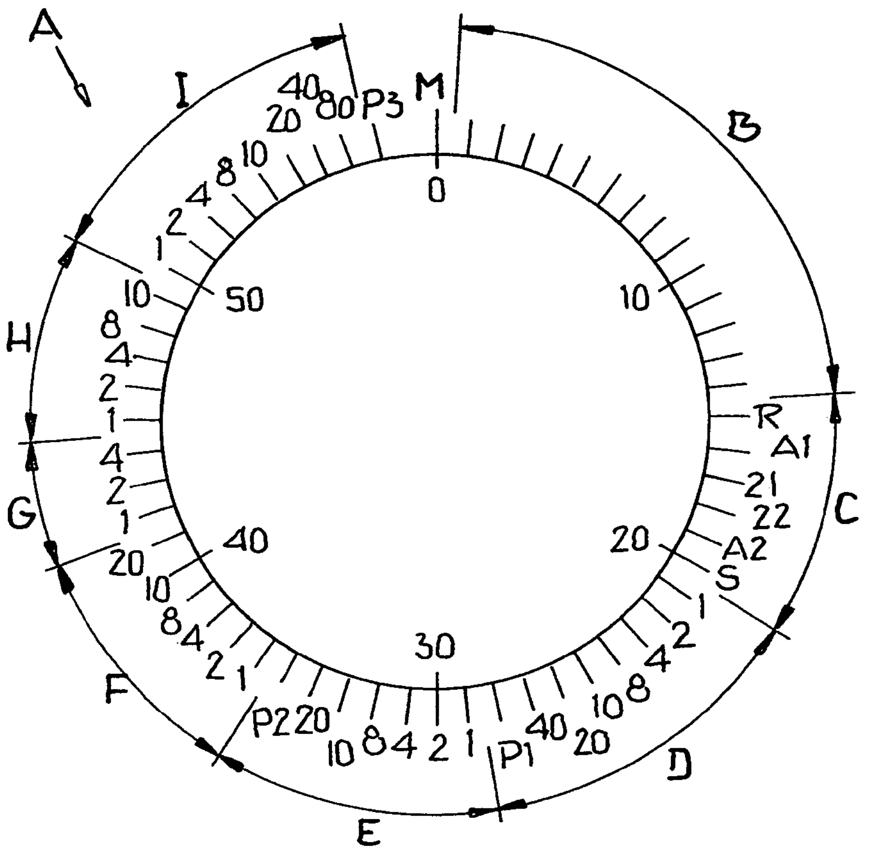
FIG. 1 illustrates a time signal telegram or encoding scheme for example of the German time signal transmitter DCF-77 which transmits encoded time information.
Figure 2:
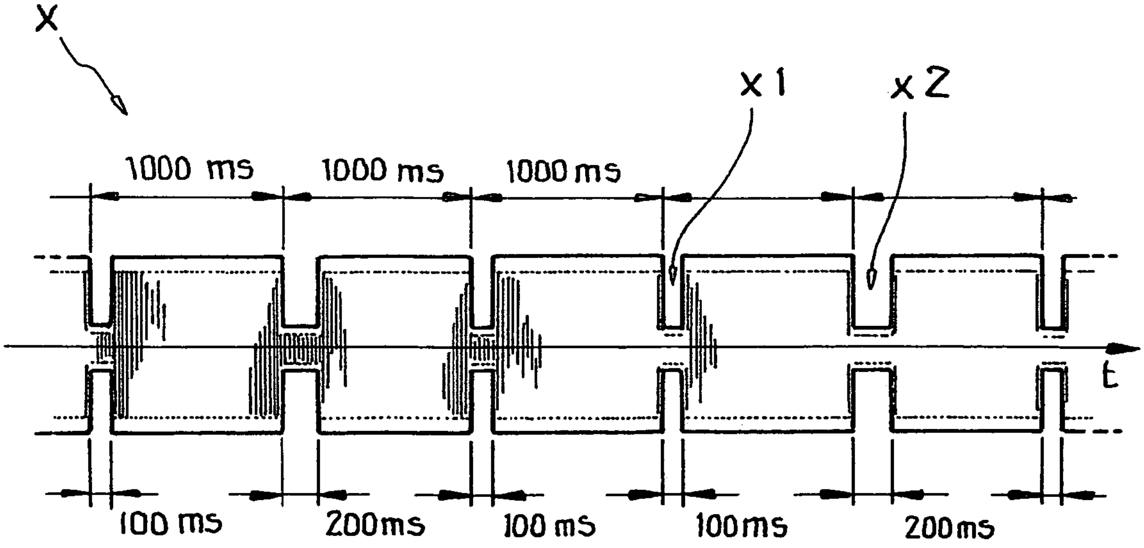
FIG. 2 shows a portion of five second markers of an amplitude modulated time signal transmitted without disturbances by the DCF-77 transmitter.

DETAILED DESCRIPTION OF A PREFERRED EXAMPLE EMBODIMENT AND OF THE BEST MODE OF THE INVENTION

In the drawings all equivalent or functionally equivalent elements and signals are designated with the same reference characters unless otherwise indicated.

Figure 3:
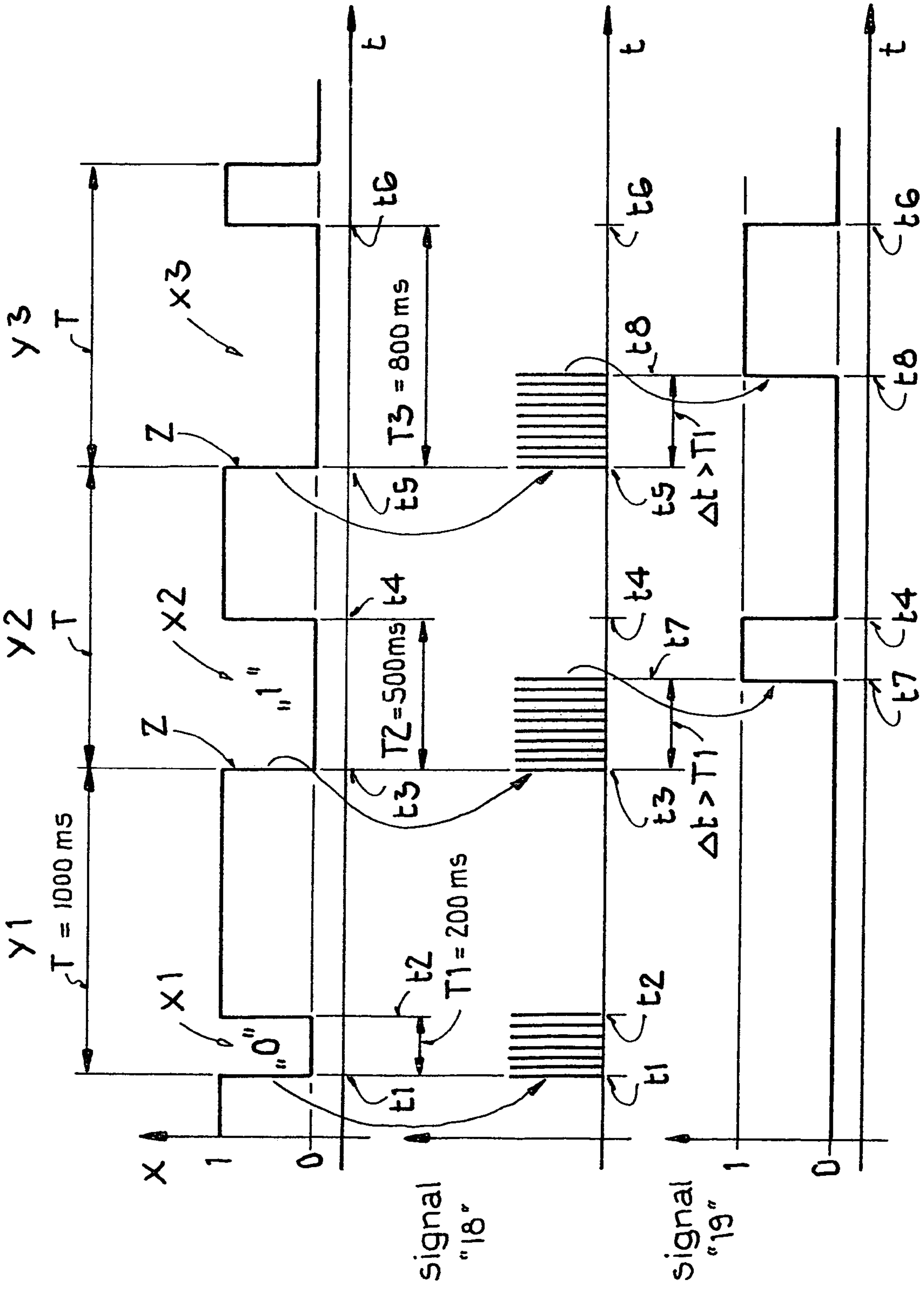
FIG. 3 illustrates a portion of a time signal transmitted by the United States transmitter WWVB, for explaining the present invention with reference to this time signal.

FIG. 3 shows a portion of a time signal transmitted by the United States time signal transmitter WWVB. This time signal diagram is used for explaining the invention. It should be noted that the illustration of FIG. 3 is not suitable for reproducing a special encoding. FIG. 3 is merely shown as an example. Further, the scale along the time axis t has been enlarged to provide a better overview.

FIG. 3 shows three complete time frames Y1, Y2 and Y3 of the time signal X. The duration of each time frame is exactly T=1000 msec. The time signal X transmitted by the US time signal transmitter WWVB comprises three different second impulses for the binary encoding. These second impulses represent amplitude reductions. More specifically, first amplitude reductions X1 have a duration of T1=200 msec. Second amplitude reductions X2 have a duration T2=500 msec. Third amplitude reductions X3 have a duration T3=800 msec. The first reductions X1 correspond to the binary "0" and the second reductions X2 correspond to the binary "1", whereby one data bit is formed by one binary "1" and one binary "0". The third amplitude reductions X3 occur in the time telegram of the WWVB transmitter respectively at the beginning of a minute protocol and as position markers every ten seconds within the minute telegram.

It is assumed that the automatic amplification is adjusted to the nominal level of the transmitted time signal X. More specifically, the initial amplification is adjusted to a mean value close to the high level. Accordingly, the automatic amplification adjustment should, as far as possible, not be caused to track the level of the time signal X in the range of the amplitude reductions X1, X2, X3. It is further assumed that the dynamic of the AGC amplifier is such that the automatic amplifications would follow the level of the time signal X at the amplitude reductions X2 and X3, if the method of the invention would not be implemented. The first amplitude reduction X1 with its duration of T1=200 msec is so short that, due to the inertia of the AGC amplifier the automatic amplification adjustment would not follow the level of the time signal X or would follow it only to a negligible extent.

A first embodiment of the present method will now be explained. It is assumed that the received time signal X is synchronized with the beginning of a minute within the time signal telegram. This assumption means that a respective begin Z of a second is known.

It is known from the telegram of the received time signal X stored in a memory, at which position the amplitude reductions X3 occur, whereby X3 has a duration that is relevant for the AGC amplification adjustment. It is also known in advance where the additional reductions X1 and X2 are present in the time signal. Since the received time signal X is synchronized to the beginning of the minute protocol the individual starting points of times t1, t3 and t5 are known to respectively designate the begin of a second Z. The end points of time t2, t4 and t6 can simply be ascertained through the durations T1, T2 and T3 of the respective amplitude reductions X1, X2 and X3 by means of a counter operated by a reference clock signal. Thus, the AGC amplifier needs to be locked-in only at the respective starting point t5 of the reduction X3 that is critical for the AGC adjustment. The locked-in status of the AGC amplifier is released at the end of the time t6 or shortly thereafter following the reduction X3. As a result, the reduction X3 does not lead to any undesirable follow-up of the automatic amplification adjustment.

Advantageously, the prevention of such follow-up for a long time duration does not have any effect on the demodulation and decoding of the time signal X.

Other AGC-critical reductions X2 cannot be ascertained with this method since from the telegram it is not known at which position such AGC-critical reductions X2 occur or are present. In this context the difficulty resides particularly in the fact that the reductions X1, X2 or the respective data bits may assume randomly variable values as controlled by the respective time signal transmitter. Compared thereto, however, the AGC-critical reductions X3 are known in the case of the time signals X transmitted by the WWVB transmitter. This is so because the reductions X are present at the beginning of a respective minute telegram and respectively after 10 seconds within a telegram.

A second embodiment of the present method will now be explained. In this second embodiment the expectable duration T1, T2 and T3 of an amplitude reduction X1, X2 and X3 is determined in advance as follows, please see FIG. 3.

In order to ascertain whether any one of the amplitude reductions X1, X2, X3 is an AGC-critical reduction X2, X3, the duration of these reductions is measured by counting cycles of a reference clock signal Clk. The counting begins with the respective beginning of a second Z. The resulting count signal 18 is thus a measure for the already past duration of an amplitude reduction X1, X2, X3. If after passing an AGC-critical duration ΔT which is longer in duration than the duration T1=200 msec of the first reduction the amplitude of the time signal X does not return to the nominal amplification level, it follows that the reduction in question must necessarily be either a second or a third reduction X2, X3. Thus, directly following the passage of the duration T1, the conclusion can be made whether the currently present amplitude reduction is not critical for the AGC, as the reduction X1, or whether it is an AGC-critical reduction X2 or X3. If the time signal X following the AGC-critical duration ΔT, that is at the points of time t7, t8, has not reached its nominal level again, then a control signal 19 is produced. If there is an AGC-critical amplitude reduction X2, X3, the amplification of the AGC amplifier is immediately locked-in following the expiration of the duration ΔT. Such locking-in takes place even before the AGC amplifier can adapt its amplification to the respective amplitude reduction X2, X3. At the end of the time points t4, t6 of the reductions X2, X3, the automatic gain control or adjustment is again released by resetting the control signal 19.

A third embodiment of the present method will now be described. Alternatively to the above described methods an AGC-critical reduction X2, X3 may also be determined in advance by estimating the expected durations T2, T3. The basis of this third embodiment of the present method is the recognition that in case of a known telegram of a transmitted time signal X there cannot be present random time durations. The invention is also based on the recognition that for different sequentially following minute telegrams there must be areas which do not change over several minute telegrams, for example, areas containing status informations, and informations relating to the year, month and the week. Based on the knowledge of such data bits of preceding minute telegrams, it is possible to estimate at which position AGC-critical reductions X2, X3 may be present in the actual, current minute telegram and to also estimate at which positions reductions X1 are present which are not AGC-critical.

A precondition for making the above mentioned estimates is the storing of the informations provided by preceding telegrams in a memory provided for this purpose. It is also necessary that the stored information can be correspondingly evaluated in order to make the estimates, whether in the actual or current present minute telegram AGC-critical reductions are present and at which position within the actual, current minute telegram these amplitude reductions are presumably present.

Figure 4:
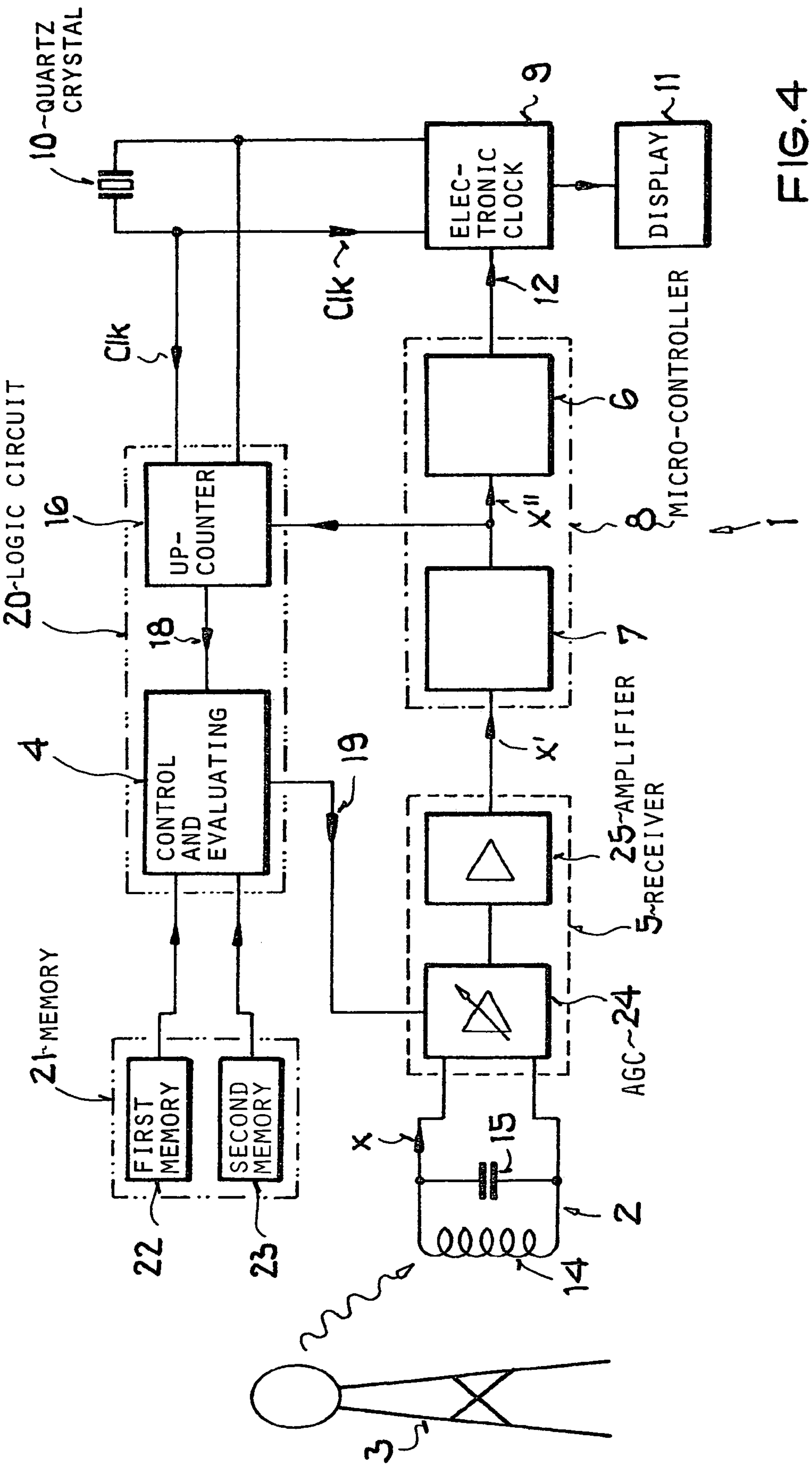
FIG. 4 is a simplified block circuit diagram of the present circuit arrangement in a radio-controlled clock for implementing the present method.

FIG. 4 illustrates in a simplified block diagram a circuit arrangement according to the invention for performing the present methods for example in a radio-controlled clock.

A radio-controlled clock 1 comprises one or more antennas 2 for receiving the time signals X transmitted by a time signal transmitter 3. The antenna 2 is, for example, a coil 14 with a ferrite core. A capacitive element 15 is connected in parallel to the coil 14. A receiver 5 for the time signals X is connected to the antenna 2. The receiver 5 comprises typically one or several filters such as a bandpass filter and a rectifier circuit for filtering and rectifying the received time signal X. The construction and function of such receivers 5 as such are known, for example from the above mentioned Patent Publications so that no further description is necessary.

However, the following components of the receiver circuit 5 should be mentioned. An automatic gain control amplifier circuit 24 receives the antenna signal and the amplification is automatically adapted to the amplitude of a transmitted and received time signal X. As shown the AGC circuit functions as a preamplifier stage 24, the output of which is connected to at least one further amplifier stage 25.

The amplifier stages 24, 25 produce an amplified output signal X' which is supplied to a demodulator 7 which in turn provides a demodulated output signal X" that is supplied to a decoder 6 and to an up-counter 16. The decoder 6 decodes the information contained in the time signal X".

The decoder 6 and the demodulator 7 are preferably part of the overall receiver circuit arrangement 5 or they can be separate components of the radio-controlled clock 1. As shown, the demodulator 7 and the decoder 6 form part of a program controlled unit 8 which is typically a microcontroller which, in case of a radio-controlled clock 9, is for example constructed as a four bit controller capable to receive and calculate from the data bits produced by the decoder 6 an exact time and an exact date. A signal 12 is produced based on the calculated time and date for the electronic clock 9 that has a display 11.

The electronic clock 9 further has inputs connected to a quartz crystal 10 that controls the time of day. The clock 9 corrects the time signal 12 in accordance with the quartz crystal control signal Clk, also used as a clock signal.

According to the invention the receiver circuit 1 is equipped with a memory 21 comprising a first memory area 22 and a second memory area 23. In the first memory area 21 one or more time signal telegrams may be stored for example. These telegrams may be respectively allocated to different time signal transmitters. In the second memory area 23 the predetermined amplitude reductions X2 and X3 are stored. As explained above, these amplitude reductions have been determined in advance and these amplitude reductions are AGC-critical relative to a respective telegram.

The memory 21 is connected to a control and evaluation unit 4 which retrieves from the memory 21 those informations that show at which time positions the AGC-critical amplitude reductions X2, X3 are present in the transmitted time signal X.

The control and evaluating unit 4 controls the AGC amplifier stage 24 in accordance with the information received from the memory 21 so that the amplification is locked-in in response to the presence of an AGC-critical amplitude reduction X2, X3 that was determined in advanced. Upon completion or just shortly before a completion of the AGC-critical amplitude reduction X2, X3 the locked-in amplification of the AGC-circuit 24 is again released, particularly at a predetermined point of time, for example the beginning of a second.

To gain the information at which point of time within the time signal X the AGC-critical amplitude reduction X2, X3 is present, the control and evaluating unit 4 is connected with a counter 16. This counter 16 functions as an up-counter which is clocked by a clock reference signal Clk generated by a generator 10. The above mentioned quartz 10 can be used for this clocking purpose. The up-counter 16 is reset to zero at each beginning of a second Z. This resetting is performed when the amplitude of the time signal X changes form “HIGH” to “LOW”.

The begin of a second Z of a respective change is known since the time signal X is synchronized to the minute protocol. Additionally or alternatively the beginning of a second Z can be ascertained with a two-bit shift register not shown in FIG. 4. The demodulated time signal X" is supplied to the input of such a shift register. A two-bit output signal is provided by such a shift register. The two bits of this output signal are distinguished from one another provided a change in the amplitude of the time signal X" is present.

The counter 16 counts steadily, starting with zero, the cycles of the reference clock signal Clk. The actual or current count of the counter 16 provides an output count signal 18 which is applied to the input of the control and evaluating unit 4. The count signal 18 is a measure for the duration of an amplitude reduction X2, X3 of the time signal X". The evaluation unit 4 evaluates this duration with the beginning of an amplitude reduction X2, X3. The signal duration is compared with an AGC-critical time duration ΔT. If the duration of the amplitude reduction X2, X3 is longer than the critical duration ΔT then a control signal 19 is generated by the evaluating unit 4 and the AGC amplifier stage 24 is locked-in by this control signal 19.

Although the invention has been described above with reference to preferred example embodiments, the invention is not limited thereto, but can be modified in many ways. Particularly, the invention is not limited to the above indicated numbers which are merely examples. It is to be understood that the disclosed concrete circuit arrangement is one possible variant of an example embodiment of an AGC circuit which can be modified by exchanging simple structural components or functional units of the present circuit arrangement. Further, the invention is not limited to the disclosed time signal transmitters. These transmitters were merely used for providing a better understanding of the invention without limiting the invention in this respect. In this context the term "radio-controlled clock" includes clocks that receive the time signals by wire, for example as is customary in clock systems that are built-in and have the above described structure.

The above description refers to an encoding that is realized by a reduction in the carrier signal at the beginning of a time frame. It is to be understood that such encoding can also be realized by increasing of the carrier signal amplitude or generally by changing the amplitude of the carrier signal.

Although the invention has been described above with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for obtaining time information from amplitude modulated received time signals (X) which comprise a plurality of time frames (Y1-Y3) of constant duration (T), said method comprising the following steps:

a) automatically amplifying said received time signals (X), b) storing a telegram containing at least one received time signal (X) in a first memory (21, 22) to provide a stored telegram, c) predetermining at least one amplitude change (X2) of the time signal amplitude to provide at least one predetermined amplitude change having a duration that is longer than a determined time duration (Δt), and d) locking-in said automatic amplifying with a time reference to said at least one predetermined amplitude change (X2).

2. The method of claim 1, further comprising unlocking said automatic amplification when said at least one predetermined amplitude change (X2) stops or ends.

3. The method of claim 1, wherein said locking-in step holds said automatic amplifying at an amplification value that was present prior to said at least one predetermined amplitude change (X2).

4. The method of claim 1, further comprising predetermining a plurality of amplitude change (X2, X3) on the basis of said stored telegram of said time signal (X) and storing said plurality of predetermined amplitude changes (X2, X3) in a second memory (21, 23).

5. The method of claim 1, further comprising synchronizing said received time signal (X) with a beginning of a minute of said stored telegram.

6. The method of claim 1, further comprising predetermining a presumable time duration (T1) of said at least one predetermined amplitude change (X1) during a demodulation and evaluation of said at least one received time signal (X).

7. The method of claim 1, further comprising predetermining a time duration (T1) of said at least one predetermined amplitude change (X1) by estimating a presumable time duration (T1) of said at least one amplitude change (X1).

8. The method of claim 1, further comprising performing said locking-in step (d) after completion of said determined time duration (Δt) following a beginning of said at least one predetermined amplitude change (X2), whereby said automatic amplifying is stopped after a beginning of said predetermined amplitude change (X2).

9. The method of claim 1, further comprising performing said locking-in step (d) without any delay, whereby said automatic amplifying is locked-in when said at least one predetermined amplitude change (X2) begins.

10. The method of claim 1, comprising the further steps of:

e) providing said time information of said time signal (X) in a bit-by-bit manner, and f) allocating to each of said plurality of said time frames (Y1-Y3) at least one data bit, wherein a value of a respective data bit is determined by a respective duration (T1, T2) of said at least one predetermined amplitude change, wherein a first duration (T1) corresponds to a first logic value of said at least one data bit and wherein a second duration (T2) corresponds to a second logic value of said at least one data bit.

11. The method of claim 10, wherein said first logic value is a logic zero and wherein said second logic value is a logic one.

12. The method of claim 1, wherein said at least one predetermined amplitude change of said time signal (X) is a reduction (X1) of the amplitude of said time signal (X).

13. The method of claim 10, wherein said first duration (T1) is shorter than said second duration (T2).

14. The method of claim 13, further comprising predetermining a plurality of amplitude changes (X2, X3) of said time signal (X) and wherein each of said plurality of amplitude changes has a duration corresponding at least to said second duration (T2) within said time signal (X).

15. The method of claim 14, wherein said second duration (T2) is longer than or equal to 500 msec.

16. The method of claim 14, wherein said second duration (T2) is equal to or larger than 800 msec.

17. A receiver circuit arrangement for a radio-controlled clock, comprising:

a) a first memory (21, 22) for storing at least one telegram of a received time signal (X) transmitted by a time signal transmitter, b) an amplifier for amplifying a received time signal (X), said amplifier comprising at least one automatic amplifier stage (24) providing an amplification which is adaptable to an amplitude change of said received time signal (X), c) a control unit (4) for controlling said at least one automatic amplifier stage (24), said control unit (4) being coupled to said first memory (21, 22), said control unit (4) being adapted for controlling said automatic amplifier stage (24) in response to a predetermined amplitude change (X2, X3) of said time signal (X), said amplitude change having a duration that is longer than a determined duration (Δt) so that an amplification is locked-in at said predetermined amplitude change (X2, X3) when said determined duration (Δt) is exceeded.

18. The circuit arrangement of claim 17, comprising a second memory (23) for storing at least one further predetermined amplitude change (X2, X3) of said time signal (X), said at least one further amplitude change having a duration longer than said determined duration (Δt).

19. The circuit arrangement of claim 17, further comprising a demodulator (7) having an input connected to an output of said amplifier (24, 25) for demodulating said time signal (X), and an evaluating circuit for estimating or determining in advance during said demodulating a presumable duration of an amplitude change (X1-X3) of said time signal (X).

20. The circuit arrangement of claim 17, further comprising a signal generator (10) for providing a reference clock signal (Clk), a counter (16) connected to receive said reference clock signal for counting reference clock cycles thereby providing a count signal (18) that is a measure for the duration (T1-T3) of said amplitude change (X1-X3), and wherein said control unit (4) comprises an evaluating circuit connected to receive said count signal (18) from said counter (16) for evaluation, said evaluating circuit having an output connected to said automatic amplifier stage (24) for providing a first control signal (19) to said at least one automatic amplifier stage (24) in response to said count signal (18) exceeding a predetermined count corresponding to said determined duration (Δt).

21. The circuit arrangement of claim 17, wherein said automatic amplifier stage (24) is a preamplifier stage for an automatic gain control adjustment, and wherein said amplifier comprises at least one further amplifier stage (25) connected to an output of said automatic gain control amplifier stage (24).

22. The circuit arrangement of claim 20, wherein said control unit including said evaluating circuit and said counter (16) are constructed as a logic circuit (20).

23. The circuit arrangement of claim 20, wherein said logic circuit is hardwired.

* * * * *